Feb. 22, 1927.

H. W. SANFORD

JOURNAL BOX AND AXLE

Filed July 19, 1923

Inventor
Hugh W. Sanford
By Cyrus Kehr
Attorney

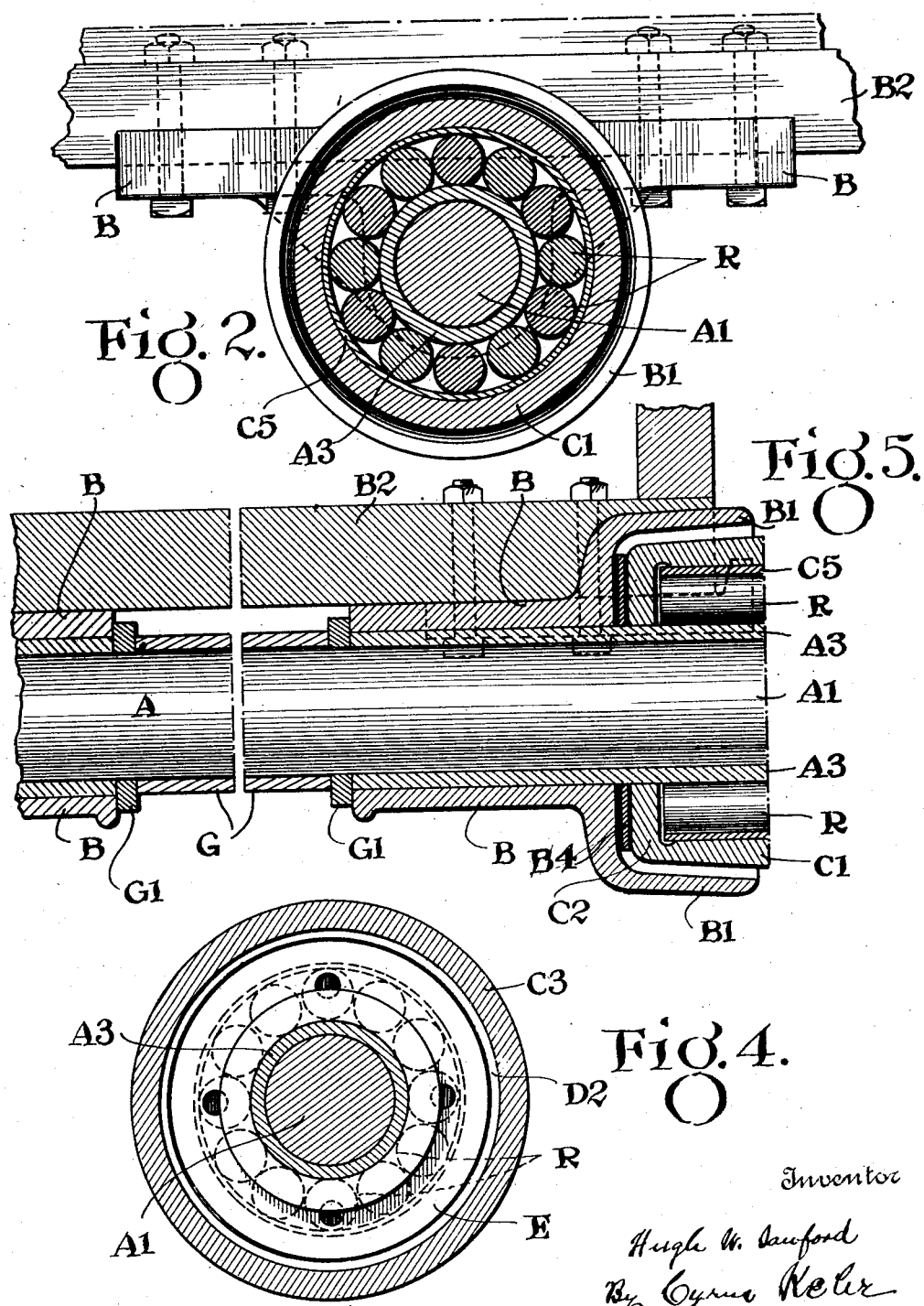

Patented Feb. 22, 1927.

1,618,890

UNITED STATES PATENT OFFICE.

HUGH W. SANFORD, OF KNOXVILLE, TENNESSEE.

JOURNAL BOX AND AXLE.

Application filed July 19, 1923. Serial No. 652,585.

This improvement relates particularly to the axles, axle boxings, and wheels of mine cars.

The object of the invention is to provide greater strength for a given thickness of axle and to provide a structure which will permit the removal of the wheel from the axle without displacing the anti-friction rollers ordinarily used in such wheels.

In the accompanying drawings,

Fig. 2 is an upright, transverse section on the line, 2—2, of Fig. 1, looking toward the left;

Fig. 4 is an upright, transverse section on the line, 4—4, of Fig. 1, looking toward the left;

Fig. 5 is a view similar to Fig. 1, but showing only the left hand part of the structure shown by Fig. 1, and that part being in another form.

Figure 1:
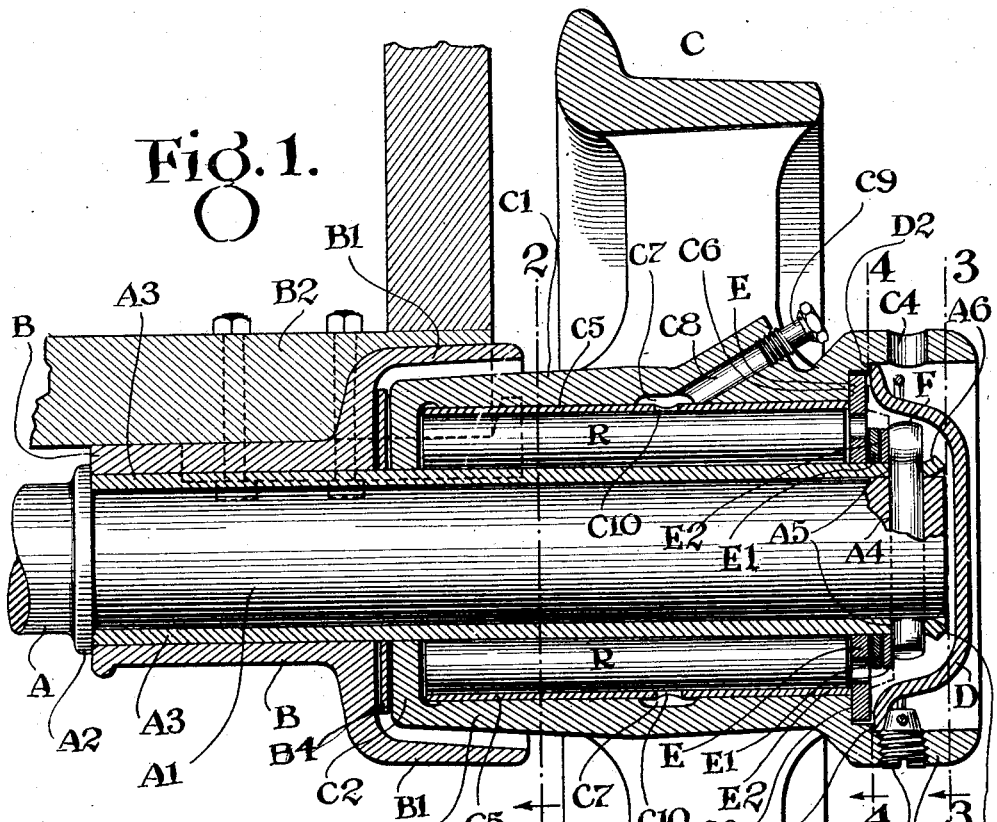
Fig. 1 is a longitudinal, upright section in the upright plane extending along the axial line of one of the axles of the car.
Figure 3:
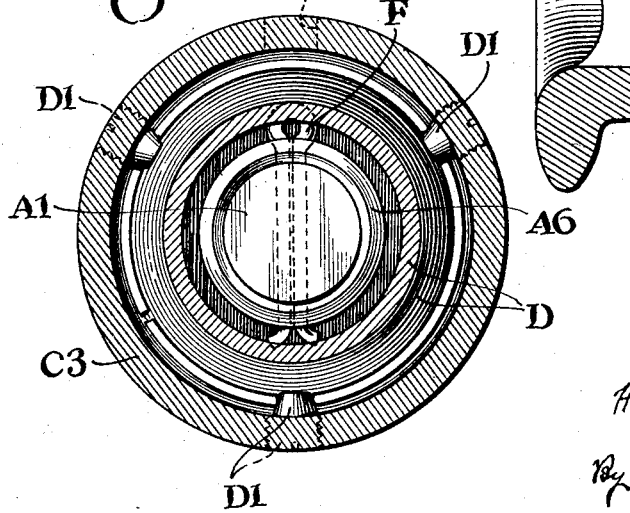
Fig. 3 is an upright, transverse section on the line, 3—3, of Fig. 1, looking toward the left.

Referring to said drawings, A, is the axle. $A^1$ is the journal or the part of the axle which extends through the axle boxing and the wheel.

At the junction of the body of the axle, A, and the journal, $A^1$, is an annular shoulder or rib, $A^2$, which extends outward far enough to engage the adjacent end of the axle boxing, B. A sleeve or tube, $A^3$, extends around the journal, $A^1$, from the annular shoulder, $A^2$, outward to the end of the journal. Near its outer end, the journal, $A^1$, has a transverse aperture, $A^4$; and the sleeve, $A^3$, has apertures, $A^5$, registering with the aperture, $A^4$. A cotter pin, F, extends through said apertures. The adjacent end of the sleeve is flared or up-set to form a flange, $A^6$, extending outward away from the journal. The purpose of this flange will appear later.

The axle boxing, B, is secured to the car bottom, $B^2$, in any desired manner. The main part of the axle boxing closely surrounds the sleeve, $A^3$, while the outer end of the axle boxing is flared to form a flange, $B^1$, extending around the inner end of the hub, $C^1$, of the wheel, C.

The inner end of the hub has a cross wall, $C^2$, extending to the sleeve, $A^3$. At its outer end the wheel hub has an annular flange, $C^3$, of larger diameter than the interior of the hub. In said flange is an aperture, $C^4$, through which the cotter pin, F, may be moved for releasing the wheel from the axle. At the junction of the flange, $C^3$, and the main part of the hub is an annular shoulder, $C^6$, transverse to the length of the axle. A washer, E, surrounds the journal and the sleeve, $A^3$, and bears against said shoulder. Between said washer and the cotter pin are two washers, $E^1$ and $E^2$, the washer $E^1$, bearing against the washer, E, and the washer, $E^2$, and the washer, $E^2$, bearing against the washer, $E^1$, and against the cotter pin.

Between the end wall, $C^2$, of the hub and the adjacent transverse face of the axle boxing, a washer, $B^4$, surrounds the journal and the sleeve, $A^3$.

Within the hub and between the end wall, $C^2$, and the washer, E, are anti-friction rollers, R, which bear on the sleeve, $A^3$, and the steel liner, $C^5$, said liner being a cylindrical shell forming a lining for the body of the hub.

An annular channel, $C^7$, is formed on the interior of the hub to receive lubricating oil through the port, $C^8$, which is controlled by the spring and ball grease screw, $C^9$. To facilitate the passing of oil, the steel liner is provided with apertures, $C^{10}$. This means of lubrication, considered by itself is old.

A circular disc-shaped cap, D, extends over the end of the axle journal and the end of the sleeve, $A^3$, and rests against the annular shoulder, $D^2$, formed on the interior of the hub adjacent the washer, E. Three wedge screws, $D^1$, extend radially through the flange, $C^3$, and press the cap, D, against the annular shoulder, $D^2$. This cap is to be put into position after the wheel and the sleeve, $A^3$, and the washers, E, $E^1$ and $E^2$, and the cotter pin, F, have been put into position. When the wheel is to be removed from the axle, the cap, D, is first removed by retracting the wedge screws, $D^1$. This cap and the means for securing it do not, by themselves, form a part of the present invention.

On examining the function of the tubular sleeve, $A^3$, it will be seen that said sleeve may be regarded as closely associated with or as forming a part of the wheel. When the cap, D, and the cotter pin, F, have been removed, said sleeve is free from the journal; but if the wheel is then moved outward for removal from the journal, the sleeve is withdrawn from the journal with the wheel and remains in the wheel. This is because the washers, E, E¹ and E², fit closely to the sleeve, and the flange, A⁶, of the sleeve prevents movement of those washers outward over the end of the sleeve.

Thus retaining the sleeve in the wheel has an important practical advantage. The sleeve serves as a retainer for the rollers, R, the rollers being kept in the space between the sleeve and the walls of the hub of the wheel. This arrangement makes it possible to remove and replace the wheel without displacing the rollers. This avoids the necessity of replacing rollers fallen out of their places and it also avoids the need of cleaning any rollers that fall in the dirt after the removal of the wheel. In other words, combining the sleeve in this manner with the wheel and rollers makes the wheel self-contained or adapted to remain assembled when removed from the journal.

A further advantage of this construction is the added strength given to the structure for a given journal diameter. The part of the sleeve reaching through the axle box is virtually an extension of the wheel and avoids or reduces the localizing of transverse journal strains at the inner end of the hub. The sleeve serves to distribute such strains. Furthermore, this form of the sleeve permits its easy manufacture of high carbon steel tubing which will give greater strength than could be had from an equal cross section of the ordinary machine steel from which axles of this form are made. Thus an axle boxing of a given interior diameter may be a part of such a structure having greater strength than can be had without the use of the sleeve.

But yet further, the sleeve makes possible the use of a superior and at the same time cheaper axle. For this reference is made to Fig. 5. In this form, the axle, A, and the journals, A¹, constitute a continuous cylindrical piece of cold rolled high carbon steel shafting, which is stronger than ordinary machinery steel of equal diameter, which is used when the fixed annular shoulder, A², of Fig. 1 is to be produced. In place of the fixed shoulder, A², a ring or washer, G¹, is placed around the axle against the axle boxing. This is done at each axle box and the space between those washers or rings is filled with a sleeve, G, surrounding the axle. Said sleeve forms an abutment for the rings, G¹, and thereby the rings are held against the axle boxings. Thus these rings are made to act as though they were fixed on the axle.

From the foregoing it will be seen that in the form shown by Fig. 5 we have the combination of advantages above recited.

It will be understood that this improvement is applicable to axles or journals and hubs in structures other than mine cars.

I claim as my invention:

1. The combination of an axle, a hub, a sleeve surrounding the axle within the hub, means at the outer end of the sleeve for holding the hub on the axle, rollers between the sleeve and the hub, and means adapted to be engaged by the outer end of the hub and to engage the outer end of the sleeve for the removal of the sleeve from the axle with the hub, substantially as described.

2. The combination of an axle, a hub, a sleeve surrounding the axle within the hub and having its outer end laterally extended, means for holding the hub on the axle, rollers between the sleeve and the hub, and means engaging the laterally extended part of the sleeve for its removal from the axle with the hub, substantially as described.

3. The combination of an axle, a hub, a sleeve surrounding the axle within the hub and having its outer end laterally extended, rollers between the sleeve and the hub, a transverse member engaging the axle for holding the sleeve on the axle, and a hub-retaining washer surrounding the sleeve between the transverse member and rollers, substantially as described.

4. The combination of an axle, a hub, a sleeve surrounding the axle within the hub and having its outer end laterally extended, rollers between the sleeve and the hub, a cotter-pin extending through the sleeve and the axle, and a hub-retaining washer surrounding the sleeve between the rollers and the cotter-pin, substantially as described.

5. The combination of an axle, an axle box surrounding the axle, a hub, a sleeve surrounding the axle within the hub and the axle box, means at the outer end of the sleeve for holding the hub on the axle, and means placed at the outer end of the hub and adapted to be engaged by the hub and to engage the sleeve for the removal of the sleeve from the axle with the hub, substantially as described.

6. The combination of an axle, an axle box, a hub, a sleeve surrounding the axle within the hub and the axle box, means for holding the hub on the axle, and a washer surrounding the sleeve at the outer end of the hub, the sleeve and the washer being formed for interengagement during removal of the hub from the axle, substantially as described.

7. The combination of an axle, an axle box, a hub, a sleeve surrounding the axle within the hub and the axle box and having its outer end laterally extended, means for holding the hub on the axle, and means engaging the exterior of the laterally extended part of the sleeve for its removal from the axle with the hub, substantially as described.

8. The combination of an axle, an axle box, a hub, a sleeve surrounding the axle within the hub and the axle box and having its outer end laterally extended, means for holding the hub on the axle, a transverse member engaging the axle for holding the sleeve on the axle, and a washer surrounding the sleeve between the transverse member and the hub, substantially as described.

9. The combination of an axle, an axle box, a hub, a sleeve surrounding the axle within the hub and the axle box and having its outer end laterally extended, means for holding the hub on the axle, a cotter-pin extending through the sleeve and the axle, and a washer surrounding the sleeve between the cotter-pin and the hub, substantially as described.

10. The combination of an axle, an axle box, a hub, a sleeve surrounding the axle within the hub and the axle box, rollers between the sleeve and the hub, and means located at the outer end of the hub and adapted to be engaged by the outer end of the hub and to engage the outer end of the sleeve for the removal of the sleeve from the axle with the hub, substantially as described.

11. The combination of an axle, an axle box, a hub, a sleeve surrounding the axle within the hub and the axle box, rollers between the sleeve and the hub, and a washer surrounding the sleeve at its outer end and at the outer end of the hub, the sleeve and washer being formed for interengagement during removal of the hub from the axle, substantially as described.

12. The combination of an axle, an axle box, a hub, a sleeve surrounding the axle within the hub and the axle box and having its outer end laterally extended, rollers between the sleeve and the hub, and means at the outer end of the hub for engaging the laterally extended part of the sleeve for its removal from the axle with the hub, substantially as described.

13. The combination of an axle, an axle box, a hub, a sleeve surrounding the axle within the hub and the axle box and having its outer end laterally extended, rollers between the sleeve and the hub, a detachable transverse member engaging the axle for holding the sleeve on the axle, and a washer surrounding the sleeve between the transverse member and rollers, substantially as described.

14. The combination of an axle, an axle box, a hub, a sleeve surrounding the axle within the hub and the axle box and having its outer end laterally extended, rollers between the sleeve and the hub, a cotter-pin extending through the sleeve and the axle, and a washer surrounding the sleeve between the rollers and the cotter-pin, substantially as described.

15. The combination of an axle, a hub on each end of the axle, a sleeve surrounding the axle in each hub, means at the outer end of each hub for engaging the adjacent hub sleeve for its removal from the axle with the hub, and a sleeve surrounding the axle between the hub sleeves, substantially as described.

16. The combination of an axle, a hub and an axle box on each end of the axle, a sleeve surrounding the axle in each hub and axle box, means at the outer end of each hub for engaging the adjacent hub sleeve for its removal from the axle with the hub, and a sleeve surrounding the axle between the hub sleeves, substantially as described.

17. The combination of an axle, a hub on each end of the axle, a sleeve surrounding the axle in each hub, and a sleeve surrounding the axle between the hub sleeves, substantially as described.

18. The combination of an axle, a hub and an axle box on each end of the axle, a sleeve surrounding the axle in each hub and axle box, and a sleeve surrounding the axle between the hub sleeves, substantially as described.

19. The combination of an axle and hub on each end of the axle, a sleeve surrounding the axle in each hub, a sleeve surrounding the axle between the hub sleeves, and a washer between each hub sleeve and the adjacent end of the axle sleeve, substantially as described.

20. The combination of an axle, a hub, rollers within the hub, a sleeve surrounding the axle between the axle and the rollers, the external diameter of the sleeve at the outer ends of the rollers being the maximum external diameter of said sleeve from said ends of the rollers to and including the inner end of the sleeve, means for holding the hub on the axle, and means between the hub and the outer end of the sleeve and adapted to be engaged by the outer end of the hub and to engage the sleeve for the removal of the sleeve from the axle with the hub, substantially as described.

21. The combination of an axle, a hub having a removable outer end, a sleeve surrounding the axle within the hub, means for holding the hub on the axle, rollers between the sleeve and the hub, and means adapted to be engaged by the outer end of the hub and to engage the sleeve for the removal of the sleeve from the axle with the hub, substantially as described.

In testimony whereof I have signed my name, this 17th day of July, in the year one thousand nine hundred and tweney-three.

HUGH W. SANFORD.